United States Patent
Memon

(10) Patent No.: US 6,818,687 B2
(45) Date of Patent: Nov. 16, 2004

(54) MODIFIED ASPHALT WITH CARRIER AND ACTIVATOR MATERIAL

(76) Inventor: G. Mohammed Memon, 46525 Hollymead Pl., Sterling, VA (US) 20165

( * ) Notice: Subject to any disclaimer, the term of this patent is extended or adjusted under 35 U.S.C. 154(b) by 0 days.

(21) Appl. No.: 10/391,232

(22) Filed: Mar. 18, 2003

(65) Prior Publication Data

US 2004/0186205 A1 Sep. 23, 2004

(51) Int. Cl.⁷ .............................................. C08L 95/00
(52) U.S. Cl. ............................. 524/68; 524/69; 524/70; 524/71
(58) Field of Search ...................... 524/68–71

(56) References Cited

U.S. PATENT DOCUMENTS

| 6,429,241 | B1 | 8/2002 | Liang |
| 6,451,886 | B1 | 9/2002 | Krivohlavek et al. |
| 2002/0111401 | A1 | 8/2002 | Izumoto |

*Primary Examiner*—Peter Szekely
(74) *Attorney, Agent, or Firm*—Lawrence E. Laubscher, Jr.

(57) ABSTRACT

A polymer modified asphalt is characterized by the addition of a carrier material such as mineral oil. The carrier material is mixed with an activator material and then added to a hot mixture of polymer and asphalt. The activator assists the polymer material in linking with the asphalt while the carrier prevents the formation of gel or lumps within the asphalt. The modified asphalt retains its rheological and solubility characteristics.

10 Claims, 1 Drawing Sheet

MODIFIED ASPHALT WITH CARRIER AND ACTIVATOR MATERIAL

BACKGROUND OF THE INVENTION

The present invention relates to improved modified asphalt characterized by better binding of the modifier material to the asphalt.

The addition of polymers to asphalt improves the physical and mechanical properties of the asphalt. The most commonly used polymers are styrene butadiene styrene (SBS), styrene butadiene (SB) and styrene butadiene rubber (SBR). Polymer modified asphalts (PMA) are used in pavement and roofing materials. Modified asphalts and asphalt emulsions are primarily produced through conjugated-diene backbone type polymers.

A number of techniques are currently used to link polymers with asphalt. One technique is to use asphalt binders. However, such binders do not meet all of the requirements developed by the SUPERPAVE protocol. Inferior binders result in damage to asphalt pavement including permanent deformation, thermal cracking and flex fatigue. These damages diminish the life of the pavement.

Another linking technique uses additives to assist with coupling the polymer modifier material to asphalt molecules to produce polymer modified asphalts. These coupling additives include alkyl polysulfide, poly phosphoric acid, dithio carbamates, phosphorous penta-sulfide, 4-4'-dithiomorpholine, furfural, thiozole derivatives, phosphorous penta oxide, hydrogen peroxide sodium hydroxide, and sulfur trioxide.

A major drawback of conventional polymer modified asphalts is that the asphalt develops a gel in certain portions thereof resulting from over-reactivity of the linking or activator material with the modifier material. This is particularly the case where polymer modified asphalt is stored prior to installation. Gel formation makes the polymer modified asphalt difficult to work with and install.

BRIEF DESCRIPTION OF THE PRIOR ART

Polymer modified asphalts are well-known in the prior art as evidenced by the U.S. Pat. No. 6,444,731 to Memon, U.S. Pat. No. 6,451,886 to Krivohlavek and U.S. Pat. No. 6,429,241 to Liang and by published U.S. patent application No. 20020111401 to Izumoto. These references disclose the use of different linking additives to generate stable polymer modified asphalt, especially for polymers including conjugated-diene. The modified asphalts are stable in the storage and are easy to transport.

However, a major drawback of modified asphalts according to the prior art is the over-reactivility of the linking agent or activator with the polymer during storage. Thus, over time, a gelatinous mass is formed within the asphalt which inhibits the uniformity of the mixture and makes the modified asphalt difficult to handle and apply.

The present invention was developed in order to overcome these and other drawbacks of the prior modified asphalts by providing an anti-gelatinous carrier with the activator material to prevent gel formation and provide a smoother polymer modified asphalt.

SUMMARY OF THE INVENTION

Accordingly, the present invention relates to a method for making a modified asphalt in which a modifier material is mixed with hot asphalt to form an asphalt mixture and in which a carrier material is mixed with a hot activator material to form a carrier slurry. The carrier and activator materials have similar gravity properties to facilitate mixing thereof. The carrier slurry is then mixed with the asphalt mixture to produce a modified asphalt having improved rheological, separation and solubility characteristics.

The modifier material is preferably a polymer or granular crumb rubber. Suitable polymers include styrene butadiene styrene (SBS), styrene butadiene (SB) and styrene butadiene rubber (SBR). The activator is preferably an acid containing a trace amount of sulfur and the carrier is mineral oil.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
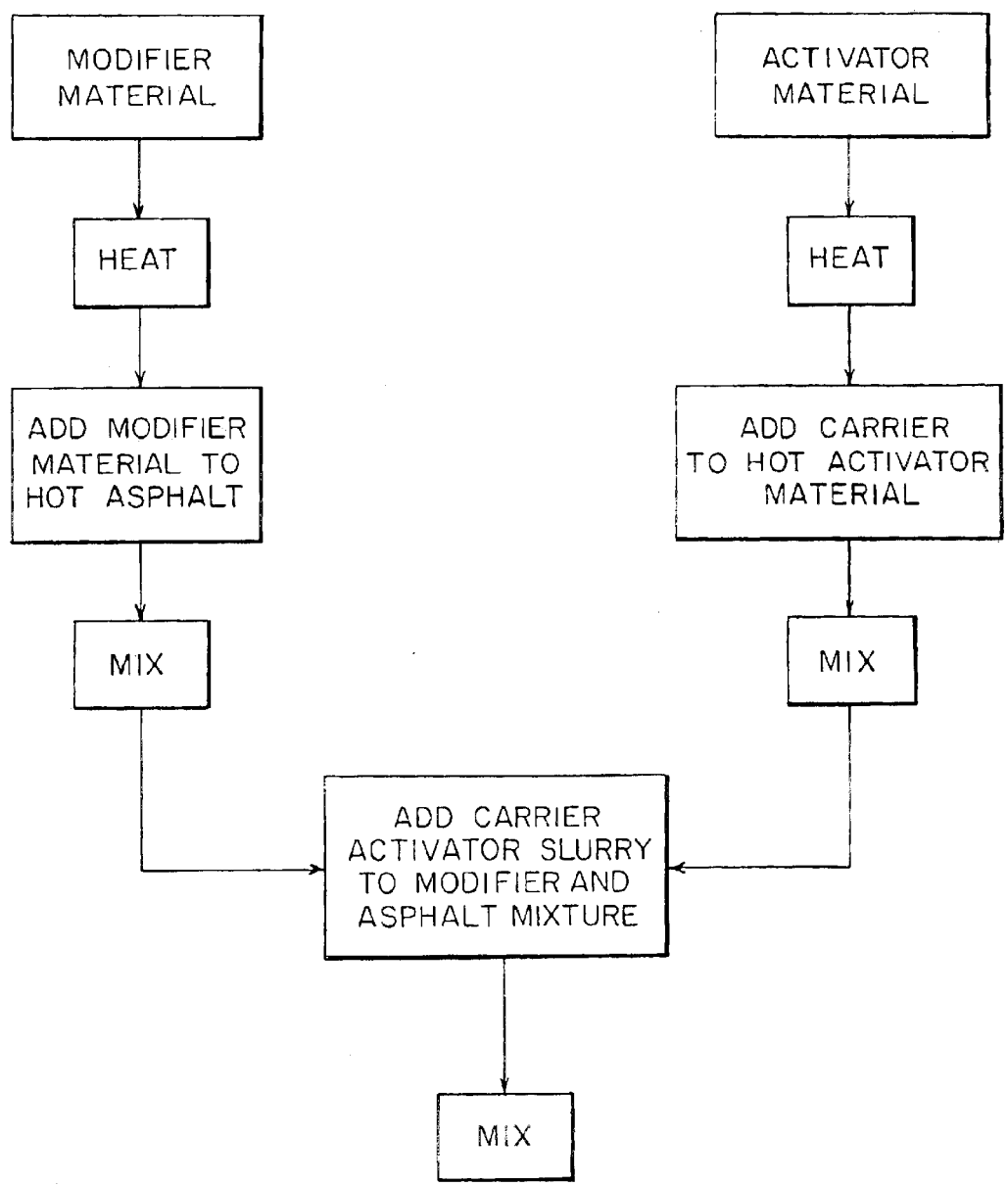
FIG. 1 is a flow diagram showing the method steps for making modified asphalt according to a preferred embodiment of the invention.

The invention will be described with reference to FIG. 1. As shown therein, a modifier material is heated and added to hot asphalt and then mixed. Preferably, the asphalt is PG 52-34, 58-28, 64-22 or 67-22. The modifier is a conjugated—diene backbone type polymer such as styrene butadiene styrene (SBS), styrene butadiene (SB) and styrene butadiene rubber (SBR). An example of SBR is granular crumb rubber obtained from discarded automobile tires. The temperature range for the heated modifier material and heated asphalt is 160° C.–220° C.

An activator or linking material in a solid form is heated between 65° C. and 260° C. and preferably to around 115° C. Next, a carrier material at room temperature is mixed with the heated activator material to form a carrier slurry. The carrier material for a particular activator material is selected according to Archimedes' Principle wherein the materials have similar specific gravity characteristics. By selecting the appropriate carrier material, a surfactant material is not needed for the activator/carrier slurry.

A preferred activator is a powdered acidic material containing a trace amount of sulfur such as is disclosed in the Memon U.S. Pat. No. 6,444,731. If desired, a microactivator material such as phenyl formaldehyde resin can also be used.

The preferred carrier material is soybean oil or mineral oil such as Parol 350, Parol 320, or Parol 225 or Drakeol 35, 34, or 32 having viscosities at 100° C. and gravities of 60/60 degrees F.

Set for below in Table I are the slurry breaking time of the activator and carrier mixture for different carrier materials.

TABLE I

| Oil Used | Slurry Breaking Time | Slurry Breaking Volume | Slurry Breaking % |
|---|---|---|---|
| Soybean | 24 hours | 4 ml | 80% |
| Drakeol 35 | 96 hours | 1.6 ml | 32% |
| Drakeol 34 | 96 hours | 1.2 ml | 24% |
| Drakeol 32 | N/A | 0.2 ml | 4% |
| Parol 225 HP | 96 hours | 1.0 ml | 20% |
| Parol 320 HP | N/A | 0.25 ml | 5% |
| Parol 350 HP | 96 hours | 0.5 ml | 10% |

The amount of carrier material used lo form the carrier slurry is between 35 and 65% by weight of the activator material.

Referring once again to FIG. 1, the carrier slurry is added to the heated modifier and asphalt mixture and mixed. The activator enhances linking of the polymer to the asphalt molecules while the carrier prevents the formation of gel within the mixture. The modified asphalt does not contain any lumps and has improved rheological and solubility characteristics.

In Table II is shown the rheological properties (PG) for polymer modified asphalts with and without carrier material.

TABLE II

| Asphalts Used | PG of the Base Asphalt | PG of the PMA without Carrier | Useful Temperature Range | PG of the PMA with Carrier | Useful Temperature Range |
|---|---|---|---|---|---|
| PG 67–22 | 67–23 | 78–24 | 102 | 77–25 | 102 |
| PG 64–22 | 65–23 | 78–24 | 102 | 77–25 | 102 |
| PG 58–28 | 59–28 | 71–29 | 100 | 70–30 | 100 |
| PG 52–34 | 53–35 | 66–36 | 102 | 65–36 | 101 |

Thus, the carrier materials do not negatively impact the rheological properties of the asphalt and avoid the requirements for surfactants. They also prevent gel and lump formation. Moreover, the mineral oils are environmentally safe.

Table It also shows the continuous PG grades and useful temperature range for four different neat and modified asphalts with and without Parol 320 HP mineral oil. All four asphalts show similar characteristics without temperature fluctuations.

Table III shows the different physical properties of different carrier materials.

TABLE III

| Types of Oils Used | Viscosity SUS @ 100° F. | Specific Gravity @ 60° F. | Bulk Density of Oil g/ml | Bulk Density of Oil & Activator Mixture | Separation of Mixture |
|---|---|---|---|---|---|
| Soybean | 310 | 0.9725 | 0.79575 | 0.99856 g/ml | 85% |
| Drakeol 32 | 321 | 0.8725 | 0.8596 | 0.99389 g/ml | 8% |
| Drakeol 34 | 390 | 0.871 | 0.842551 | 1.01679 g/ml | 10% |
| Drakeol 35 | 352.5 | 0.8785 | 0.8642 | 1.11146 g/ml | 12% |
| Parol 225 HP | 221 | 0.866 | 0.862921 | 1.06262 g/ml | 10% |
| Parol 320 HP | 319 | 0.8710 | 0.86001 | 0.99489 g/ml | 7% |
| Parol 350 | 360 | 0.8698 | 0.854951 | 1.01367 g/ml | 9% |
| Activator | — | — | 0.715751 | — | |

From Table III, it is evident that the selection of the proper carrier material is crucial to achieve the appropriate characteristics of the modified asphalt. The most suitable carriers are Drakeol 32 and Parol 320 HP. Slurries and modified asphalts formed with these materials can be stored for extended periods of time without the formation of gel or lumps so that the slurry material is easily transported or pumped.

While the preferred forms and embodiments of the invention have been illustrated and described, it will be apparent to those of ordinary skill in the art that various changes and modification may be made without deviating from the inventive concepts set forth above.

What is claimed is:

1. A method for making a modified asphalt comprising the steps of
   (a) mixing a modifier material with asphalt at a temperature of 160° C.–220° C. to form an asphalt mixture;
   (b) mixing a carrier material with an acidic activator material to form a carrier slurry, said carrier and activator materials having corresponding specific gravity properties according to Archimedes' Principle; and
   (c) mixing said carrier slurry with said asphalt mixture to produce a modified asphalt material which has improved rheological, separation and solubility characteristics.

2. A method as defined in claim 1, where said modifier material is selected from the group consisting of polymer and granular crumb rubber.

3. A method as defined in claim 2, wherein said activator material contains a trace amount of sulfur and said carrier material comprises mineral oil.

4. A method as defined in claim 3, wherein said activator material further comprises a phenyl formaldehyde resin.

5. A modified asphalt material comprising
   (a) asphalt having a temperature of 160° C.–220° C.;
   (b) a granular modifier material;
   (c) an acidic activator material for activating the hot asphalt and modifier material to link the asphalt and modifier material to produce a modified asphalt product with improved theological, separation and solubility characteristics; and
   (d) a carrier material for preventing formation of gel in the modified asphalt product, said activator and carrier materials having corresponding specific gravity properties according to Archimedes' Principle.

6. A modified asphalt material as defined in claim 5, wherein said carrier material comprises mineral oil.

7. A modified asphalt as defined in claim 6, wherein said modifier material is selected from the group consisting of polymer and granular crumb rubber.

8. A modified asphalt as defined in claim 5, wherein said activator material further comprises a phenyl formaldehyde resin.

9. A method as defined in claim 1, wherein said activator material is heated to between 65° C. and 260° C.

10. A modified asphalt as defined in claim 5, wherein said activator material is heated to between 65° C. and 260° C.

* * * * *